United States Patent [19]

Lee

[11] Patent Number: 5,995,703

[45] Date of Patent: Nov. 30, 1999

[54] APPARATUS FOR GENERATING A SCREEN FADE EFFECT IN A VIDEO DISC REPRODUCING SYSTEM

[75] Inventor: Eun-Gug Lee, Seoul, Rep. of Korea

[73] Assignee: Daewoo Electronics Co., Ltd., Seoul, Rep. of Korea

[21] Appl. No.: 08/699,858

[22] Filed: Aug. 20, 1996

[30] Foreign Application Priority Data

Aug. 21, 1995 [KR] Rep. of Korea ...................... 95-25621
Aug. 31, 1995 [KR] Rep. of Korea ...................... 95-27886

[51] Int. Cl.[6] ..................................................... H04N 5/92
[52] U.S. Cl. .................................................. 386/4; 386/53
[58] Field of Search ................................. 386/1, 4, 9, 31, 386/34, 8, 46, 52, 53, 68, 93, 111, 125, 44, 45; H04N 5/781, 5/92

[56] References Cited

U.S. PATENT DOCUMENTS 5,220,433 6/1993 Mogamiya et al. ........................ 366/8
5,625,461 4/1997 Okamoto et al. ........................ 386/53

FOREIGN PATENT DOCUMENTS 2 262 409 6/1993 United Kingdom .
2 268 025 12/1993 United Kingdom .

Primary Examiner—Huy T Nguyen
Attorney, Agent, or Firm—Smith, Gambrell & Russell

[57] ABSTRACT

An apparatus which controls a video signal reproduced from a video compact disc to gradually fade in or out on a screen in a video disc reproducing system, is disclosed. When the video signals read out from the video disc are decoded by the MPEG video decoding section, the pulse signals are generated by the screen fade driving section responsive to both the control signal from the controlling section and the vertical synchronizing signal separated from the decoded video signal, and the restored luminance signal from the MPEG video decoding section is switched over according to the fade-in or fade-out operation by the screen fade driving section responsive to both the pulse signal and the switching control signal from the controlling section. While the decoded luminance signal is selectively provided from the screen fade driving section to the displaying equipment, the pictures fade in or out on the screen at the commencement or the end of the reproduction of the video signals. Consequently, since the pictures naturally and continuously appear and disappear on the screen, a viewer's spectral luminous efficacy is enhanced.

28 Claims, 7 Drawing Sheets

FIG. 5

MSB                                        LSB

| 0 | 0 | 0 | 0 | 0 | 0 | 0 | 0 |

| 0 | 0 | 0 | 0 | 0 | 0 | 0 | S |

⋮

| 0 | S | S | S | S | S | S | S |

| S | S | S | S | S | S | S | S | ic
APPARATUS FOR GENERATING A SCREEN FADE EFFECT IN A VIDEO DISC REPRODUCING SYSTEM

BACKGROUND OF THE INVENTION

1. Field of the Invention

The present invention relates to an apparatus which controls a video signal reproduced from a video compact disc to gradually fade in or out on a screen and generate a screen fade effect in a video disc reproducing system.

2. Description of the Prior Art

At present, video compact discs (hereinafter, referred to as "video disc") are widely used as a disc-shaped information recording medium for recording video information of moving pictures and audio information. For example, video discs have video-song, i.e., karaoke, programs for video-song practice, movie programs, video and audio information of programs for learning foreign languages, which are recorded thereon after being processed by a data compression algorithm such as Moving Picture Experts Group (hereinafter, referred to as "MPEG") system.

FIG. 1 is a circuit block diagram for showing the configuration of a conventional video disc reproducing system. As shown in FIG. 1, the video disc reproducing system such as a video disc player for reading out and reproducing the recorded information from the video disc, includes a spindle motor 20, an optical pickup 40, a servo controlling section 60, an amplifying section 80, a compact disc digital signal processing (hereinafter, referred to as "CD-DSP") section 100, a CD-ROM decoding section 120, a MPEG video decoding section 140, a digital to analog converting (hereinafter referred to as "DAC") section 160, a function setting section 180, and a controlling section 200.

Spindle motor 20 rotates a video disc 10 at a constant speed. Optical pickup 40 irradiates the laser beam onto video disc 10 and reads out video and audio signals in order to provide a read video and audio signal 41.

Amplifying section 80 amplifies read video and audio signal 41 from optical pickup 40 and provides an amplified video and audio signal 81. CD-DSP section 100 digitally signal-processes amplified video and audio signal 81 from amplifying section 80 into a serial data stream and provides a first signal-processed signal 101.

CD-ROM decoding section 120 CD-ROM-decodes first signal-processed signal 101 from CD-DSP section 100 into user data and provides a CD-ROM-decoded signal 121. MPEG video decoding section 140 decodes CD-ROM-decoded signal 121 from CD-ROM decoding section by a MPEG system and provides an MPEG-video-decoded signal 141 which corresponds to restored chrominance and luminance signals.

DAC section 160 converts MPEG-video-decoded signal 141 into an analog signal and provides RGB signal 161. Function setting section 180 is installed in a control panel as a part thereof or is formed as a remote control unit and sets a reproducing function of video and audio signals recorded on video disc 10, a stop function of the reproduction operation, or a selection operation for a video-song, in order to provide a function setting signal 181.

Controlling section 200 inputs function setting signal 181 from function setting section 180 and provides first, second, third and fourth control signals 201, 202, 203 and 204. Controlling section 200 applies first control signal 201 to servo controlling section 60 and controls the servo operation of servo controlling section 60. Controlling section 200 applies second control signal 202 to CD-DSP section 100 and controls the operation of CD-DSP section 100. Controlling section 200 applies third control signal 203 to CD-ROM decoding section 120 and controls the operation of CD-ROM decoding section 120. Controlling section 200 applies fourth control signal 204 to MPEG video decoding section 140 and controls the operation of MPEG video decoding section 140.

Servo controlling section 60 inputs first control signal 201 and provides first and second servo control signals 61 and 62. Servo controlling section 60 applies first servo control signal 61 to optical pick up 40 and servo controls the driving state of optical pickup 40. Servo controlling 60 applies second servo control signal 62 to spindle motor 20 and servo controls the driving state of spindle motor 20.

As described above, video signals which are read out from video disc 10 by optical pickup 40 are successively signal-processed and are finally outputted from DAC section 160 as RGB signal 161 while passing from amplifying section 80 to DAC section 160. RGB signal 161 is reproduced as a picture having high resolution by CRT (cathode-ray tube) equipment (not shown in FIG. 1).

For example, U.S. Pat. No. 5,220,443 (issued to Mogamiya et al.) discloses a still video apparatus including picture and sound fading in which a picture of an object and a sound respectively recorded on a recording medium as an electrical picture signal and a sound signal, are reproduced. The still video apparatus includes a picture reproducing device which reproduces the picture signal and the sound signal recorded on the recording medium, a picture fading device which fades the picture signal reproduced by the picture reproducing device, and a sound fading device which fades the sound signal reproduced by the picture reproducing device.

However, in the aforementioned video disc reproducing system, the picture suddenly appears on the screen at the beginning of the reproduction or disappears during the stopping of the reproduction. Consequently, since the spectral luminous efficacy decreases by half, a viewer tends to feel unnatural or strange.

In addition, U.S. Pat. No. 5,220,433 is restricted in application thereof to still video apparatuses such as still video cameras or still video players which record or reproduce an image of a picture and a sound as electrical signals (picture signals and sound signals) on and from a magnetic disc (video floppy).

SUMMARY OF THE INVENTION

Accordingly, it is an object of the present invention to provide an apparatus which, when video signals read out from a video disc are decoded by the MPEG system, the luminance signals of the decoded video signals are controlled to gradually fade in or out on a screen at the commencement or the completion of the reproduction of the video signals.

In order to achieve the above-mentioned object, the present invention provides an apparatus for generating a screen fade effect in a video disc reproducing system, which comprises:

means for setting a function through the use of keys, including a reproducing function of a video signal recorded on a video disc and a stop function of the reproducing function and for providing a function setting signal;

controlling means for inputting the function setting signal from the function setting means and for providing first, second and third control signals in order to control fade in and fade-out operations at the commencement and the completion of the reproduction of the video signal recorded on the video disc;

means for decoding by the MPEG system the video signal read out from the video disc and for providing first, second and third MPEG-video-decoded signals;

means for separating a synchronizing signal from the third MPEG-video-decoded signal from the MPEG video decoding means and for providing a separated synchronizing signal;

means for separating a vertical synchronizing signal from the separated synchronizing signal from the synchronizing signal separating means and for outputting a separated vertical synchronizing signal;

screen fade driving means, responsive to the first, second and third control signals from the controlling means and to the separated vertical synchronizing signal from the vertical synchronizing signal outputting means, for adjusting the second MPEG-video-decoded signal from the MPEG video decoding means and for providing an adjusted luminance signal; and means for converting the first MPEG-video-decoded signal from the MPEG video decoding means and the adjusted luminance signal from the screen fade driving means into analog signals and for providing an RGB signal.

Preferably, the first, second and third MPEG-video-decoded signals are respectively a restored chrominance signal, a restored luminance signal and a video information data signal.

In the apparatus for generating a screen fade effect in a video disc reproducing system according to the present invention, when the video signals read out from the video disc are decoded by the MPEG video decoding section, the pulse signals are generated by the screen fade driving section responsive to both the control signal from the controlling section and the vertical synchronizing signal separated from the decoded video signal, and the restored luminance signal from the MPEG video decoding section is switched over according to the fade-in or fade-out operation by the screen fade driving section responsive to both the pulse signal and the switching control signal from the controlling section.

With this circuit configuration, while the decoded luminance signal is selectively provided from the screen fade driving section to the displaying equipment, the pictures fade in or out on the screen at the commencement or the completion of the reproduction of the video signals. Consequently, since the pictures naturally and continuously appear and disappear on the screen, a viewer's spectral luminous efficacy is increased.

BRIEF DESCRIPTION OF THE DRAWINGS

The above objects and other advantages of the present invention will become more apparent by describing in detail a preferred embodiment thereof with reference to the attached drawings, in which:

FIG. 5 is a view for illustrating a data line through which luminance signals are inputted into a digital to analog converting section shown in FIG. 3;

DESCRIPTION OF THE PREFERRED EMBODIMENTS

A description will be given below in detail with reference to the accompanying drawings to the configuration and the operation of an apparatus for generating a screen fade effect in a video disc reproducing system according to the preferred embodiments of the present invention.

Embodiment 1

Figure 1:
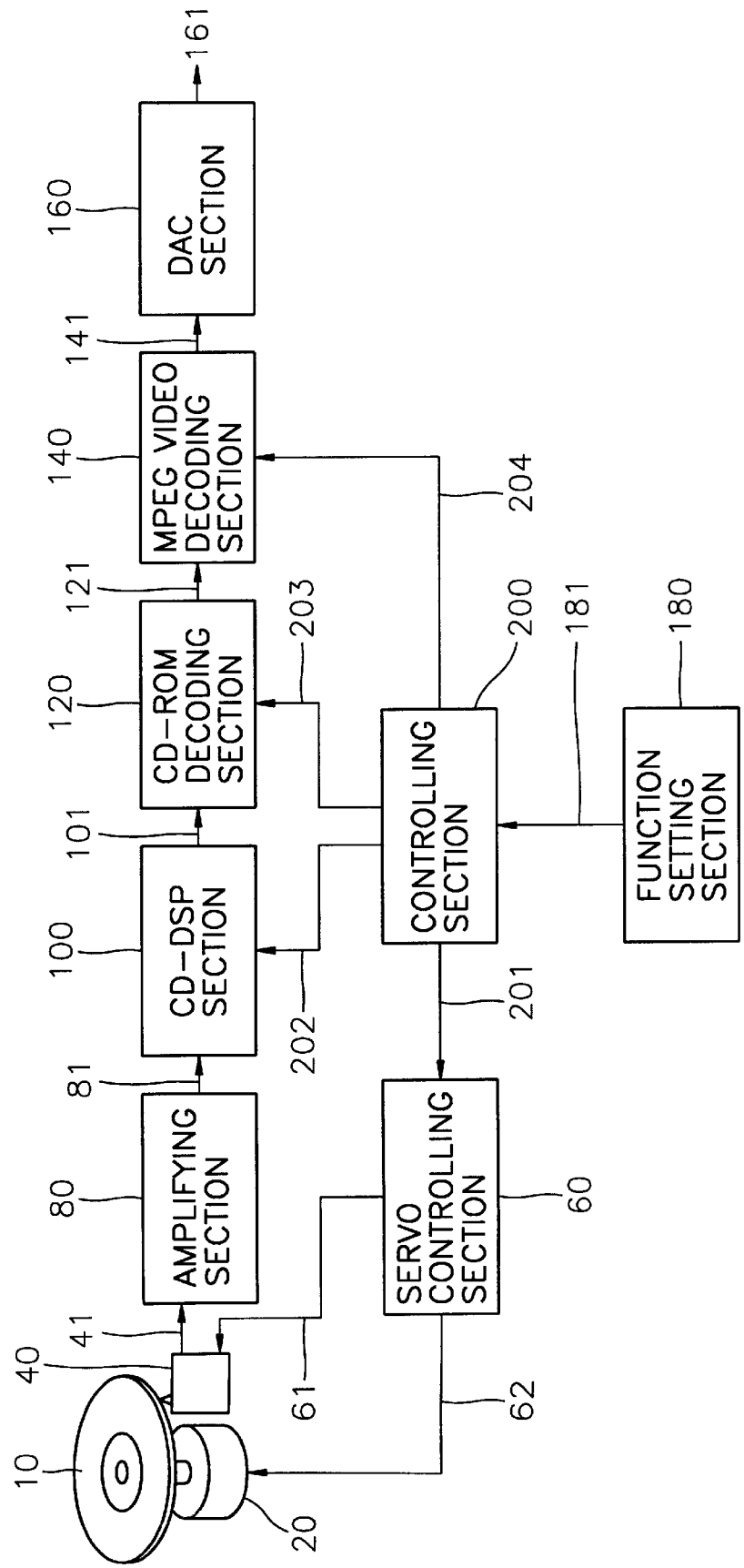
FIG. 1 is a circuit block diagram for showing the configuration of a conventional video disc reproducing system.
Figure 2:
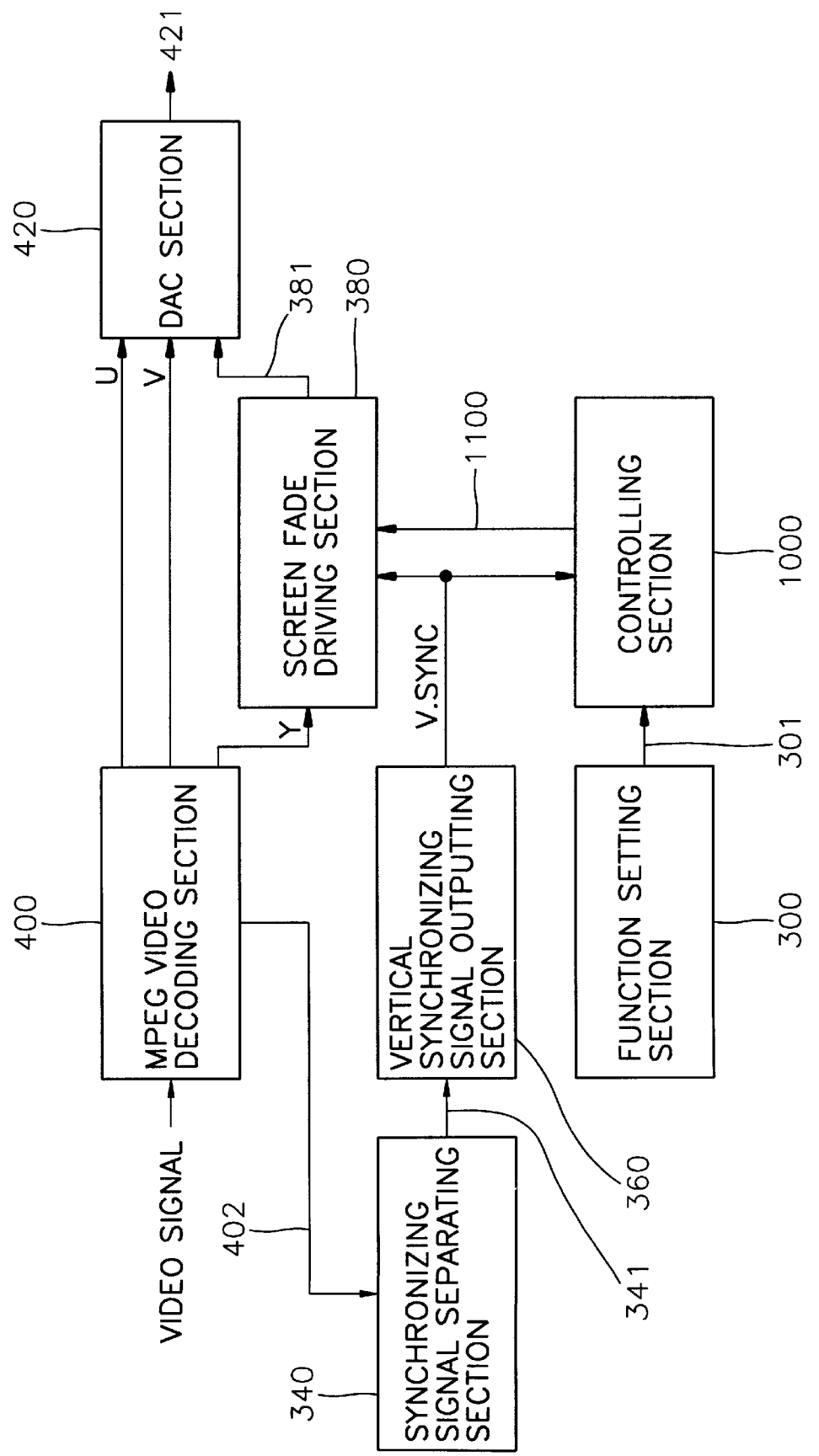
FIG. 2 is a circuit block diagram for showing the configuration of an apparatus for generating a screen fade effect in a video disc reproducing system according to the present invention.

FIG. 2 is a circuit block diagram for showing the configuration of an apparatus for generating a screen fade effect in a video disc reproducing system according to the present invention. As shown in FIG. 2, a function setting section 300 sets a function through the use of keys thereof including a reproducing function of a video signal recorded on a video disc 10 (see FIG. 1) and a stop function of the reproducing function, and provides a function setting signal 301.

A controlling section 1000 inputs function setting signal 301 from function setting section 300 and provides a control signal 1110, a switching control signal 1120 and a preset signal 1130 in order to control the fade-in and fade-out operations at the commencement and the end of the reproduction of the video signal recorded on video disc 10. A composite control signal 1100 includes control signal 1110, switching control signal 1120 and preset signal 1130.

An MPEG video decoding section 400 decodes by the MPEG system the video signal read out from video disc 10 and provides restored chrominance signals U and Y, and a restored luminance signal Y, and a video information data signal 402.

A synchronizing signal separating section 340 separates a synchronizing signal from video information data signal 402 from MPEG video decoding section 400 and provides a separated synchronizing signal 341.

A vertical synchronizing signal outputting section 360 separates a vertical synchronizing signal from separated synchronizing signal 341 from synchronizing signal separating section 340 and outputs a separated vertical synchronizing signal V.SYNC.

A screen fade driving section 380 adjusts restored luminance signal Y from MPEG video decoding section 400 while responding to control signal 1110, to switching control signal 1120, to preset signal 1130 from controlling section 1000, and to separated vertical synchronizing signal V.SYNC from vertical synchronizing signal outputting section 360, and provides an adjusted luminance signal 381.

A DAC section 420 converts restored chrominance signals U and V from MPEG video decoding section 400 and adjusted luminance signal 381 from screen fade driving section 380, into analog signals, and provides an RGB signal 421.

Figure 3:
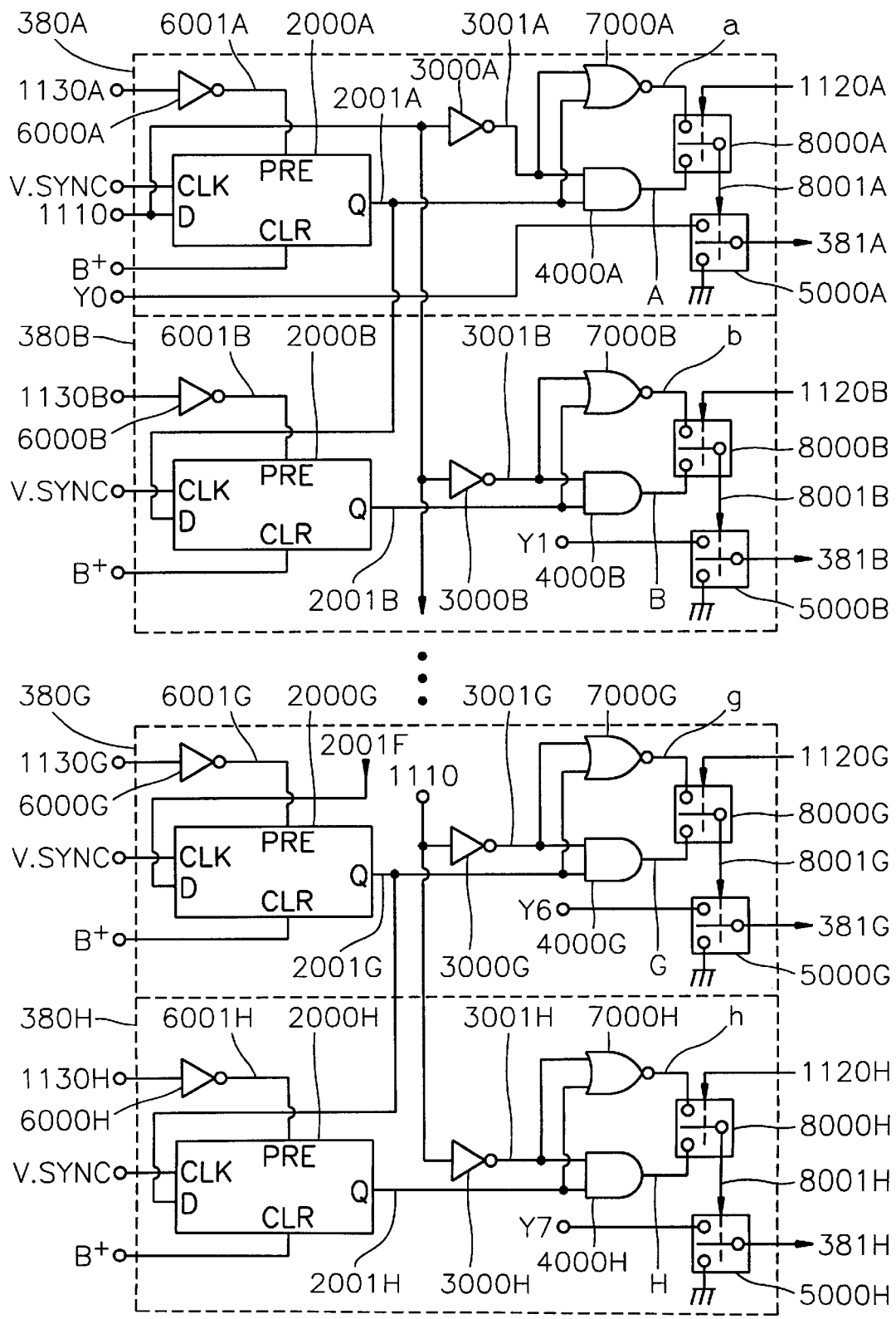
FIG. 3 is a circuit block diagram for showing the configuration of one embodiment of the screen fade driving section shown in FIG. 2.
Figure 4:
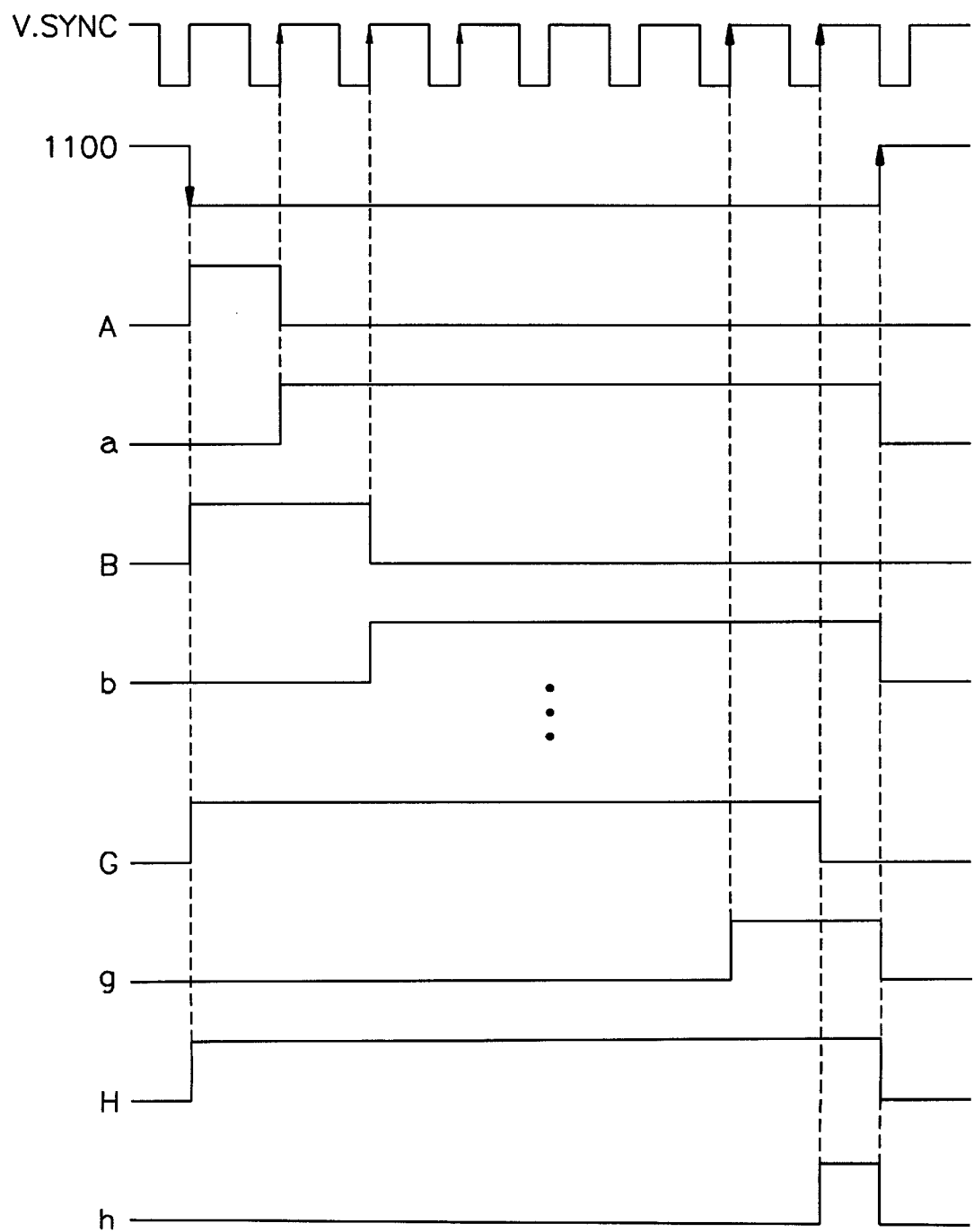
FIG. 4 is a timing chart for showing waveforms which appear at important parts of the screen fade driving section shown in FIG. 3.

FIG. 3 is a circuit block diagram for showing the configuration of one embodiment of the screen fade driving section shown in FIG. 2. FIG. 4 is a timing chart for showing waveforms which appear at important parts of the screen fade driving section shown in FIG. 3. In FIG. 3, reference numerals 380A to 380H respectively denote circuit elements of screen fade driving section 380. As shown in FIG. 3, a first pulse generating section 2000A inputs separated vertical synchronizing signal V.SYNC (see FIG. 4) from vertical synchronizing signal outputting section 360 to a CLK terminal thereof, inputs a positive DC voltage B+ from an external DC power supply (not shown) to a CLR terminal thereof, inputs control signal 1110 from controlling section 1000 to a D terminal thereof, and outputs a first pulse signal 2001A from a Q terminal thereof. First pulse generating section 2000A preferably comprises a D flip-flop.

Each of second to eighth pulse generating sections 2000B to 2000H inputs separated vertical synchronizing signal V.SYNC from vertical synchronizing signal outputting section 360 to a CLK terminal thereof, inputs positive DC voltage B+ from the external DC power supply to a CLK terminal thereof, inputs the pulse signal from a Q terminal of the pulse generating section having one-higher-rank to a D terminal of the pulse generating section having one-lower-rank, and outputs second to eighth pulse signals 2001B to 2001H from the Q terminals thereof. Each of second to eighth pulse generating sections 2000B to 2000H preferably comprises a D flip-flop.

First to eighth preset inverting sections 6000A to 6000H respectively invert the signal levels of first to eighth preset signals 1130A to 1130H from controlling section 1000, and respectively apply first to eight inverted preset signals 6001A to 6001H to PRE terminals of first to eighth pulse generating sections 2000A to 2000H in order to stop an operation of first to eighth pulse generating sections 2000A to 2000H, respectively. Each of first to eighth preset inverting sections 6000A to 6000H preferably comprises an inverter.

First to eighth inverting sections 3000A to 3000H respectively invert the signal level of control signal 1110 from controlling section 1000 and respectively output first to eighth inverted control signals 3001A to 3001H. Each of first to eighth inverting sections 3000A to 3000H preferably comprises an inverter.

First to eighth multiplying sections 4000A to 4000H respectively multiply inverted control signals 3001A to 3001H from first to eighth inverting sections 3000A to 3000H with first to eighth pulse signals 2001A to 2001H from first to eighth pulse generating sections 2000A to 2000H and respectively output first to eighth multiplied signals A to H. Each of first to eighth multiplying sections 4000A to 4000H preferably comprises an AND gate.

First to eighth inversely adding sections 7000A to 7000H respectively inversely add with first to eighth inverted control signals 3001A to 3001H from first to eighth inverting sections 3000A to 3000H to first to eighth pulse signals 2001A to 2001H from first to eighth pulse generating sections 2000A to 2000H, and respectively output first to eighth inversely added signals a to h. Each of first to eighth inversely adding sections 7000A to 7000H preferably comprises an NOR gate.

First to eighth control-switching sections 8000A to 8000H are respectively responsive to first to eighth switching control signals 1120A to 1120H from controlling section 1000, and respectively switch over between first to eighth multiplied signals A to H from first to eighth multiplying sections 4000A to 4000H and inversely added signals a to h from first to eighth inversely adding sections 7000A to 7000H in accordance with the fade-in or fade-out operation. First to eighth control-switching sections 8000A to 8000H respectively output first to eighth control-switched signals 8001A to 8001H.

First to eighth switching sections 5000A to 5000H selectively output 8-bit restored luminance signal Y0 to Y7 from MPEG video decoding section 400 while respectively responding to first to eighth control-switched signals 8001A to 8001H from first to eighth control-switching sections 8000A to 8000H, and respectively output adjusted luminance signal 381 in sequence from the least significant bit to the most significant bit thereof.

Hereinafter, a description of the operation of the apparatus for generating a screen fade effect in a video disc reproducing system which has the aforementioned circuit configuration, will be provided with reference to FIGS. 3, 4 and 5.

When an operator sets the reproduction function by the keys of function setting section 300 in order to reproduce video and audio signals recorded on video disc 10 (see FIG. 1), controlling section 1000 controls the reproduction operation. At this time, bit streams of the video signals which are read out from video disc 10 and digitally signal-processed, are decoded, i.e., restored, by MPEG video decoding section 400. Accordingly, chrominance signals U and V from MPEG video decoding section 400 are applied to DAC section 420. Each of chrominance signals U and V has 8 bits.

Then, synchronizing signal separating section 340 separates the synchronizing signal component from video information data signal 402 MPEG video decoding section 400, and outputs separated synchronizing signal 341. Successively, vertical synchronizing signal outputting section 360 separates the vertical synchronizing signal from separated synchronizing signal 341, and outputs separated vertical synchronizing signal V.SYNC.

In the meantime, as shown in FIG. 4, controlling section 1000 applies to screen fade driving section 380 control signal 1110 which maintains its signal level at a low level for the time interval between the reference leading edge and the following eighth leading edge of separated vertical synchronizing signal V.SYNC from vertical synchronizing signal outputting section 360, and then provides switching control signal 1120 related to the fade-in operation.

As shown in FIG. 3, in screen fade driving section 380, first pulse generating section 2000A inputs into the D terminal thereof control signal 1110 from controlling section 1000 which becomes a low-level pulse, while inputting into the CLK terminal thereof separated vertical synchronizing signal V.SYNC. Next, while inputting into the CLK terminals thereof separated vertical synchronizing signal V.SYNC, second to eighth pulse generating sections 2000B to 2000H respectively input into the D terminals thereof control signal 1110 from controlling section 1000 which becomes a low level pulse, and thereby respectively generate from the Q terminals thereof second to eighth pulse signals 2001B to 2001H which are respectively delayed in their trigger time position at each of the leading edges of separated vertical synchronizing signal V.SYNC.

Accordingly, first to eighth multiplying section 4000A TO 4000H respectively multiply first to eighth inverted control signals 3001A to 3001H from inverting sections 3000A to 3000H with first to eighth pulse signals 2001A to 2001H from first to eighth pulse generating sections 2000A to 2000H, and respectively output first to eighth multiplied signals A to H (see FIG. 4). As shown in FIG. 4, first to eighth multiplied signals A to H have high-level durations which increase in order by one period of separated vertical synchronizing signal V.SYNC with reference to the time position of a trailing edge of control signal 1110. First to eighth control-switching sections 8000A to 8000H respectively switch over to the output terminals of first to eighth multiplying sections 4000A to 4000H, and thereby first to eighth multiplied signals A to H are respectively outputted from first to eighth control-switching sections 8000A to 8000H as first to eighth control-switched signals 8001A to 8001H.

While first to eighth switching sections 5000A to 5000H respectively execute their switching operations in response to first to eighth control-switched signals 8001A to 8001H, 8-bit restored luminance signal Y0 to Y8 from MPEG video decoding section 400 is differently provided to DAC section 420. Since first to eighth switching sections 5000A to 5000H respectively execute the switching operation in response to first to eighth control-switched signals 8001A to 8001H which have high-level durations which increase in order with reference to the time position of the trailing edge of control signal 1110 by one period of separated vertical synchronizing signal V.SYNC. Consequently, as shown in FIG. 5, first to eighth screen fade driving signals 381A to 381H, i.e., adjusted luminance signal 381, are provided in sequence from the most significant bit to the least significant bit to DAC section 420 according to the switching operation of first to eighth switching sections 5000A to 5000H. The luminance signal which is converted into an analog signal, is visually reproduced on the screen of the CRT equipment with the fade-in function.

Next, when the time interval between the reference leading edge and the eighth leading edge of separated vertical synchronizing signal V.SYNC from vertical synchronizing signal outputting section 360 elapses, controlling section 1000 applies preset signal 1130 to the PRE terminal of each of first to eighth pulse generating sections 2000A to 2000H of screen fade driving section 380 in order to finish the fade-in operation.

When an operator enters the stopping of the reproduction function by the keys of function setting section 300, controlling section 1000 respectively applies first to eighth switching control signals 1120A to 1120H to first to eighth control-switching sections 8000A to 8000H of screen fade driving section 380 in order to start the fade-out operation. Then, first to eighth control-switching sections 8000A to 8000H respectively switch over to the output terminals of first to eighth inversely adding sections 7000A to 7000H. First to eighth inversely adding sections 7000A to 7000H respectively inversely add with inverse operation first to eighth inverted control signals 3001A to 3001H from first to eighth inverting sections 3000A to 3000H to first to eighth pulse signals 2001A to 2001H from first to eighth pulse generating sections 2000A to 2000H, and respectively output first to eighth inversely added signals a to h. As shown in FIG. 4, first to eighth inversely added signals a to h have high-level durations which decrease in order with reference to the timing of a leading edge of control signal 1110 by one period of separated vertical synchronizing signal V.SYNC. Then, first to eighth inversely added signals a to h are respectively outputted from first to eighth control-switching sections 8000A to 8000H as first to eighth control-switched signals 8001A to 8001H.

While first to eighth switching sections 5000A to 5000H respectively execute their switching operations in response to first to eighth control-switched signals 8001A to 8001H, 8-bit restored luminance signal Y0 to Y7 from MPEG video decoding section 400 is differently provided to DAC section 420. Since first to eighth switching sections 5000A to 5000H respectively execute the switching operation in response to first to eighth control-switched signals 8001A to 8001H which have high-level durations which decrease in order with reference to the time position of the leading edge of control signal 1110 by one period of separated vertical synchronizing signal V.SYNC. Consequently, as shown in FIG. 5, first to eighth screen fade driving signals 381A to 381H, i.e., adjusted luminance signal 381, are provided in sequence from the least significant bit to most significant bit to DAC section 420 according to the switching operation of first to eighth switching sections 5000A to 5000H. The luminance signal which is converted into an analog signal, is visually reproduced on the screen of the CRT equipment with the fade-out function.

Embodiment 2

FIG. 2 is a circuit block diagram for showing the configuration of an apparatus for generating a screen fade effect in a video disc reproducing system according to the present invention. As shown in FIG. 2, a function setting section 300 sets a function through the use of keys thereof including a reproducing function of a video signal recorded on a video disc 10 (see FIG. 1) and stop function of the reproducing function and provides a function setting signal 301.

A controlling section 1000 inputs function setting signal 301 from function setting section 300 and provides a control signal 1110 and a switching control signal 1120 in order to control the fade-in and fade-out operations at the commencement and the end of the reproduction of the video signal recorded on video disc 10. A composite control signal 1100 includes control signal 1110 and switching control signal 1120.

An MPEG video decoding section 400 decodes by the MPEG system the video signal read out from video disc 10 and provides restored chrominance signal U and V, a restored luminance signal Y, and a video information data signal 402.

A synchronizing signal separating section 340 separates a synchronizing signal from video information data signal 402 from MPEG video decoding section 400 and provides a separated synchronizing signal 341.

A vertical synchronizing signal outputting section 360 separates a vertical synchronizing signal from separated synchronizing signal 341 from synchronizing signal separating section 340 and outputs a separated vertical synchronizing signal Y.SYNC.

A screen fade driving section 380 adjusts restored luminance signal Y from MPEG video decoding section 400 while responding to control signal 1110, to switching control signal 1120 from controlling section 1000, and to separated vertical synchronizing signal V.SYNC from vertical synchronizing signal outputting section 360, and provides an adjusted luminance signal 381.

A DAC section 420 converts restored chrominance signals U and V from MPEG video decoding section 400 and adjusted luminance signal 381 from screen fade driving section 380 into analog signals, and provides an RGB signal 421.

Figure 6:
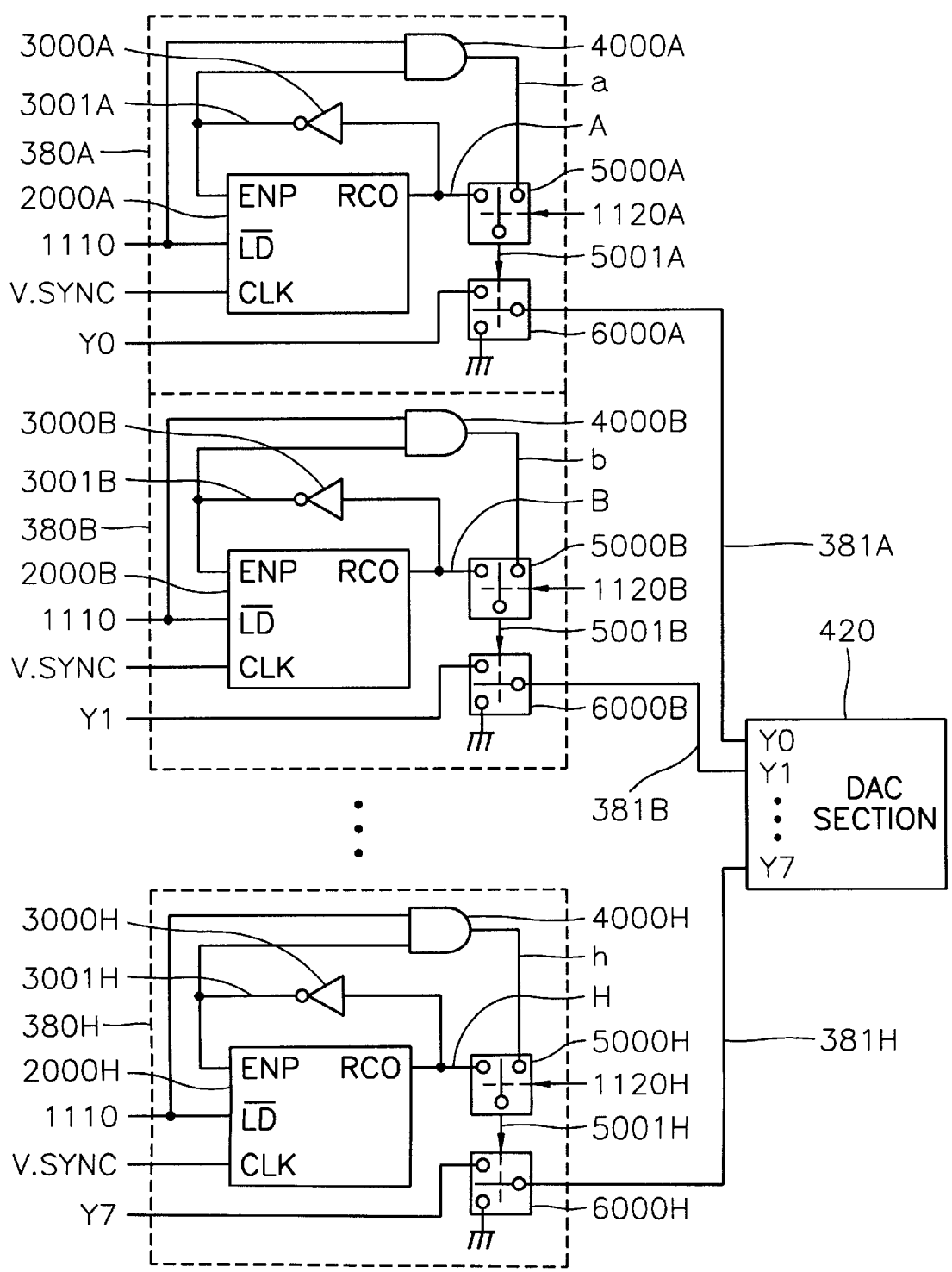
FIG. 6 is a circuit block diagram for showing the configuration of another embodiment of the screen fade driving section shown in FIG. 2.
Figure 7:
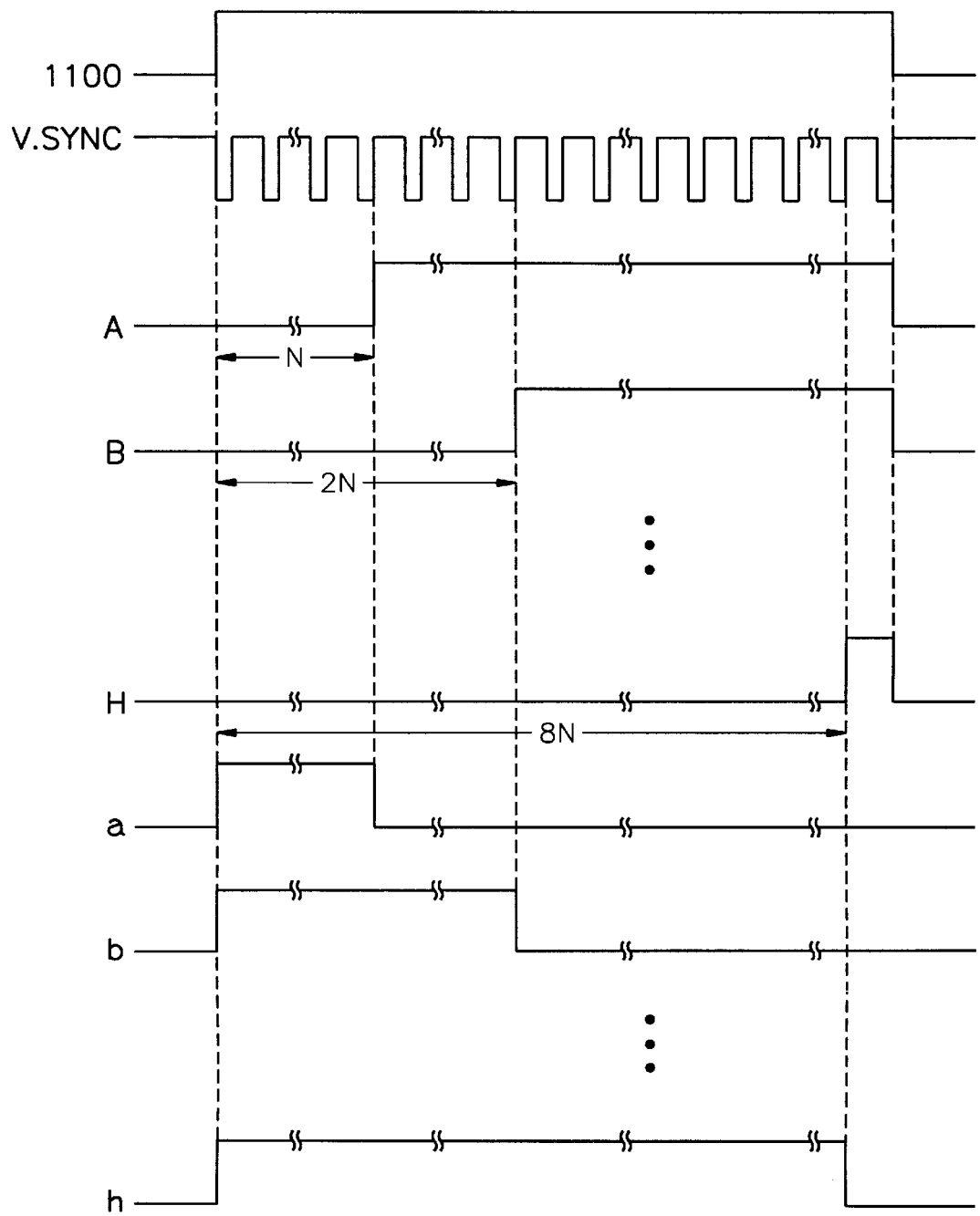
FIG. 7 is a timing chart for showing waveforms which appear at important parts of the screen fade driving section shown in FIG. 6.

FIG. 6 is a circuit block diagram for showing the configuration of another embodiment of the screen fade driving section shown in FIG. 2. FIG. 7 is a timing chart for showing waveforms which appear at important parts of the screen fade driving section shown in FIG. 6. In FIG. 6, reference numerals 380A to 380H respectively denote circuit elements of screen fade driving section 380. As shown in FIG. 6, each of first to eighth pulse generating sections 2000A to 2000H inputs separated vertical synchronizing signal V.SYNC (see FIG. 7) from vertical synchronizing signal outputting section 360 to a CLK terminal thereof inputs control signal 1110 from controlling section 1000 to a LD terminal thereof, and respectively output from RCO terminals thereof first to eighth pulse signals A to H while respectively counting N to 8N pulses of separated vertical synchronizing signal V.SYNC. Each of first to eighth pulse generating sections 2000A to 2000H preferably comprises a timer IC such as 74HC161.

First to eighth inverting sections 3000A to 3000H respectively invert the signal levels of first to eighth pulse signals A to H from first to eighth pulse generating sections 2000A to 2000H, and respectively output first to eighth inverted pulse signals 3001A to 3001H. First to eighth inverted pulse signals 3001A to 3001H are respectively applied to ENP terminals of first to eighth pulse generating sections 2000A to 2000H. Each of first to eighth inverting sections 3000A to 3000H preferably comprises an inverter.

First to eighth multiplying sections 4000A to 4000H respectively multiply first to eighth inverted pulse signals 3001A to 3001H from first to eighth inverting sections 3000A to 3000H with control signal 1110 from controlling section 1000, and respectively output first to eighth multiplied signals a to h. Each of first to eighth multiplying sections 4000A to 4000H preferably comprises an AND gate.

First to eighth control-switching sections 5000A to 5000H are respectively responsive to the first to eighth switching control signals 1120A to 1120H from controlling section 1000, and respectively switch over between first to eighth multiplied signals a to h from first to eighth multiplying sections 400A to 400H and first to eighth pulse signals A to H from first to eighth pulse generating sections 2000A to 2000H in accordance with the fade-in or fade-out operation. First to eighth control-switching sections 5000A to 5000H respectively output first to eighth control-switched signals 5001A to 5001H.

First to eighth switching sections 6000A to 6000H selectively output 8-bit restored luminance signal Y0 to Y7 from MPEG video decoding sections 400 while respectively responding to first to eighth control-switched signals 5001A to 5001H from first to eighth control-switching sections 5000A to 5000H, and respectively output adjusted luminance signal 381 in sequence from the least significant bit to the most significant bit of.

Hereinafter, a description of the operation of the apparatus for generating a screen fade effect in a video disc reproducing system which has the aforementioned circuit configuration, will be provided with reference in FIGS. 6 and 7.

When an operator enters the reproduction function by the keys of function setting section 300 in order to reproduce video and audio signals recorded on video disc 10 (see FIG. 1), controlling section 1000 controls the reproduction operation. At this time, bit streams of the video signals which are read out from video disc 10 and digitally signal-processed, are decoded, i.e., restored, by MPEG video decoding section 400. Accordingly, chrominance signals U and V from MPEG video decoding section 400 are applied to DAC section 420. Each of chrominance signals U and V has 8 bits.

Then, synchronizing signal separating section 340 separates the synchronizing signal components from video information data signal 402 from MPEG video decoding section 400, and outputs separated synchronizing signal 341.

Successively, vertical synchronizing signal outputting section 360 separates the vertical synchronizing signal from separated synchronizing signal 341, and outputs separated vertical synchronizing signal V.SYNC.

In the meantime, as shown in FIG. 7, controlling section 1000 applies to screen fade driving section 380 control signal 1110 which maintains its signal level at a high level, and then provides first to eighth switching control signals 1120A to 1120H related to the fade-in operation.

As shown in FIG. 6, in screen fade driving section 380, while inputting into the CLK terminals thereof separated vertical synchronizing signal V.SYNC, first to eighth pulse generating sections 2000A to 2000H respectively input into the LD terminals thereof control signal 1110 from controlling section 1000 which becomes a high-level pulse, and thereby respectively generate from the RCO terminals thereof first to eighth pulse signals A to H. First to eighth pulse signals A to H are in order delayed and have their signal levels changed to a high level with reference to the leading edge of control signal 1110 while inputting N to 8N of separated vertical synchronizing signal V.SYNC. First to eighth multiplying sections 4000A to 4000H respectively multiply first to eighth inverted pulse signals 3001A to 3001H from first to eighth pulse generating sections 2000A to 2000H with control signal 1110 from controlling section 1000, and respectively output first to eighth multiplied signals a to h. First to eighth multiplied signals a to h from first to eighth multiplying means 4000A to 4000H have high-level durations which increase in order with reference to the time position of the leading edge of control signal 1110 from controlling means 1000 by N period of the separated vertical synchronizing signal V.SYNC.

Therefore, first to eighth control-switching sections 5000A to 5000H respectively switch over to the output terminals of first to eighth multiplying sections 4000A to 4000H, and thereby first to eighth multiplied signals a to h are respectively outputted from first to eighth control-switching sections 5000A to 5000H as first to eighth control-switched signals 5001A to 5001H. While first to eighth switching sections 6000A to 6000H respectively execute their switching operations in response to first to eighth control-switched signals 5001A to 5001H, 8-bit restored luminance signal Y0 to Y7 from MPEG video decoding section 400 is selectively provided to DAC section 420. The luminance signal which is converted into an analog signal, is visually reproduced on the screen of the CRT equipment with the fade-in function.

On the other hand, when an operator enters the end of reproduction function by the keys of function setting section 300, controlling section 1000 respectively applies first to eighth switching control signals 1120A to 1120H to first to eighth control-switching sections 5000A to 5000H of screen fade driving section 380 in order to start the fade-out operation. Then, first to eighth control-switching sections 5000A to 5000H respectively switch over to the outputs of first to eighth pulse generating sections 2000A to 2000H. Then, first to eighth pulse signals A to H are respectively outputted from first to eighth control-switching sections 5000A to 5000H as first to eighth control-switched signals 5001A to 5001H. While first to eighth switching sections 6000A to 6000H respectively execute their switching operations in response to first to eighth control-switched signals 5001A to 5001H, 8-bit restored luminance signal Y0 to Y7 from MPEG video decoding section 400 is selectively provided to DAC section 420. The luminance signal which is converted into an analog signal, is visually reproduced on the screen of the CRT equipment with the fade-out function.

In the apparatus for generating a screen fade effect in a video disc reproducing system according to the present invention, when the video signals read out from the video disc are decoded by the MPEG video decoding section, the pulse signals are generated by the screen fade driving section responsive to both the control signal from the controlling section and the vertical synchronizing signal separated from the decoded video signal, and the restored luminance signal from the MPEG video decoding section is switched over according to the fade-in or fade-out operation by the screen fade driving section responsive to both the pulse signal and to the switching control signal from the controlling section.

With this circuit configuration, while the decoded luminance signal is selectively provided from the screen fade driving section to the displaying equipment, the pictures fade in or out on the screen at the commencement or the end of the reproduction of the video signals. Consequently, since the pictures naturally and continuously appear and disappear on the screen, a viewer's spectral luminous efficacy is enhanced.

While the present invention has been particularly shown and described with reference to a particular embodiment thereof, it will be understood by those skilled in the art the various changes in form and detail may be effected therein without departing from the spirit and scope of the invention which is defined by the appended claims.

What is claimed is:

1. An apparatus for generating a screen fade effect in a video disc reproducing system, said apparatus comprising:

means for setting a function through the use of keys thereof including a reproducing function of a video signal recorded on a video disc and a stop function of the reproducing function, and for providing a function setting signal;

controlling means for inputting the function setting signal from said function setting means and for providing first, second and third control signals in order to control fade-in and fade-out operations at the commencement and the end of the reproduction of the video signal recorded on said video disc;

video decoding means for decoding the video signal read out from said video disc and for providing first, second and third video-decoded signals;

means for separating a synchronizing signal from the third video-decoded signal from said video decoding means and for providing a separated synchronizing signal;

means for separating a vertical synchronizing signal from the separated synchronizing signal from said synchronizing signal separating means and for outputting a separated vertical synchronizing signal;

screen fade driving means, responsive to the first, second and third control signals from said controlling means and to the separated vertical synchronizing signal from said vertical synchronizing signal outputting means, for adjusting the second video-decoded signal from said video decoding means and for providing an adjusted luminance signal, wherein said screen fade driving means includes first pulse generating means for inputting the separated vertical synchronizing signal from said vertical synchronizing signal outputting means, a positive DC voltage from an external DC power supply and the first control signal from said controlling means, and for outputting a first pulse signal; second to eighth pulse generating means for inputting the separated vertical synchronizing signal from said vertical synchronizing signal outputting means, inputting the positive DC voltage from an external DC power supply, inputting the pulse signal from one higher-ranked pulse generating means of said first to eighth pulse generating means, and for respectively outputting second to eighth pulse signals; first to eighth inverting means for respectively inverting the signal level of the first control signal from said controlling means and for respectively outputting first to eighth inverted control signals; first to eighth multiplying means for respectively multiplying the inverted control signals from said first to eighth inverting means with the first to eighth pulse signals from said first to eighth pulse generating means and for respectively outputting first to eighth multiplied signals; first to eighth inversely adding means for respectively inversely adding the inverted control signals from said first to eighth inverting means to the first to eighth pulse signals from said first to eighth pulse generating means and for respectively outputting first to eighth inversely added signals; first to eighth control-switching means for respectively switching over between the first to eighth multiplied signals from said first to eighth multiplying means and the inversely added signals from said first to eighth inversely adding means in accordance with the fade-in or fade-out operation of the second control signal and for respectively outputting first to eighth control-switched signals; first to eighth switching means, respectively responsive to the first to eighth control-switched signals from said first to eighth control-switching means, for selectively outputting an 8-bit restored luminance signal from said video decoding means as the adjusted luminance signal; and first to eighth preset inverting means for respectively inverting the signal level of the third control signal from said controlling means and for respectively applying the first to eighth inverted preset signals to said first to eighth pulse generating means; and means for converting the first video-decoded signal from said video decoding means and the adjusted luminance signal from said screen fade driving means into analog signals and for providing a RGB signal.

2. The apparatus for generating a screen fade effect in a video disc reproducing system as claimed in claim 1, wherein the first, second and third video-decoded signals are respectively a restored chrominance signal, a restored luminance signal and a video information data signal.

3. The apparatus for generating a screen fade effect in a video disc reproducing system as claimed in claim 1, wherein the first, second and third control signals are respectively a control signal, a switching control signal and a preset signal.

4. The apparatus for generating a screen fade effect in a video disc reproducing system as claimed in claim 1, wherein said first to eighth control-switching means are respectively responsive to the first to eighth switching control signals from said controlling means.

5. The apparatus for generating a screen fade effect in a video disc reproducing system as claimed in claim 1, wherein said first to eight pulse generating means stop the reproduction operation thereof upon respectively inputting the first to eighth inverted preset signals.

6. The apparatus for generating a screen fade effect in a video disc reproducing system as claimed in claim 1, wherein each of said first to eighth pulse generating means comprises a D flip flop, and each of said first to eighth multiplying means comprises an AND gate.

7. The apparatus for generating a screen fade effect in a video disc reproducing system as claimed in claim 1, wherein each of said first to eighth inverting means comprises an inverter.

8. The apparatus for generating a screen fade effect in a video disc reproducing system as claimed in claim 1, wherein each of said first to eighth inversely adding means comprises an NOR gate.

9. The apparatus for generating a screen fade effect in a video disc reproducing system as claimed in claim 1, wherein the separated vertical synchronizing signal is applied from said vertical synchronizing signal outputting means to a CLK terminal of each of said first to eighth pulse generating means, and the positive DC voltage is applied from an external DC power supply to a CLR terminal of each of said first to eight pulse generating means.

10. The apparatus for generating a screen fade effect in a video disc reproducing system as claimed in claim 1, wherein the first control signal is applied from said controlling means to a D terminal of said first pulse generating means.

11. The apparatus for generating a screen fade effect in a video disc reproducing system as claimed in claim 1, wherein the first to eighth pulse signals are respectively outputted from Q terminals of said first to eighth pulse generating means, and the pulse signal is respectively applied from a Q terminal of said first to eighth pulse generating means having one-higher-rank to a D terminal of said first to eighth pulse generating means having one-lower-rank.

12. The apparatus for generating a screen fade effect in a video disc reproducing system as claimed in claim 1, wherein the first to eighth inverted preset signals are respectively applied from said first to eighth preset inverting means to PRE terminals of said first to eighth pulse generating means.

13. The apparatus for generating a screen fade effect in a video disc reproducing system as claimed in claim 1, wherein the first to eighth multiplied signals from said first to eighth multiplying means have high-level durations which increase in order by one period of the separated vertical synchronizing signal with reference to the time position of the trailing edge of the first control signal from said controlling means.

14. The apparatus for generating a screen fade effect in a video disc reproducing system as claimed in claim 1, wherein said first to eighth control-switching means respectively switch over to the output terminals of said first to eighth multiplying means in order to execute a fade-in operation and the restored luminance signal from said video decoding means is provided sequentially from the most significant bit to the least significant bit to said converting means.

15. The apparatus for generating a screen fade effect in a video disc reproducing system as claimed in claim 1, wherein the first to eighth inversely added signals from said first to eighth inversely adding means have high-level durations which decrease in order by one period of separated vertical synchronizing signal with reference to the time position of the leading edge of the first control signal from controlling means.

16. The apparatus for generating a screen fade effect in a video disc reproducing system as claimed in claim 1, wherein said first to eighth control-switching means respectively switch over to the output terminals of said first to eighth inversely adding means in order to execute a fade-out operation and the restored luminance signal from said video decoding means is provided from the least significant bit to the most significant bit to said converting means.

17. An apparatus for generating a screen fade effect in a video disc reproducing system, said apparatus comprising:

means for setting a function through the use of keys thereof including a reproducing function of a video signal recorded on a video disc and a stop function of the reproducing function, and for providing a function setting signal;

controlling means for inputting the function settling signal from said function setting means and for providing first and second control signals in order to control fade-in and fade-out operations at the commencement and the end of the reproduction of the video signal recorded on said video disc;

video decoding means for decoding the video signal read out from said video disc and for providing first, second and third video-decoded signals;

means for separating a synchronizing signal from the third video-decoded signal from said video decoding means and for providing a separated synchronizing signal;

means for separating a vertical synchronizing signal from the separated synchronizing signal from said synchronizing signal separating means and for outputting a separated vertical synchronizing signal;

screen fade driving means, responsive to the first and second control signals from said controlling means and to the separated vertical synchronizing signal from said vertical synchronizing signal outputting means, for adjusting the second video-decoded signal from said video decoding means and for providing an adjusted luminance signal, wherein said screen fade driving means includes each of first to eighth pulse generating means for inputting both the separated vertical synchronizing signal from said vertical synchronizing signal outputting means and the first control signal from said controlling means, and for respectively outputting first to eighth pulse signals while respectively counting N to 8N pulses of the separated vertical synchronizing signal; first to eighth inverting means for respectively inverting the signal levels of the first to eighth pulse signals from said first to eighth pulse generating means and for respectively outputting first to eighth inverted pulse signals; first to eighth multiplying means for respectively multiplying the first to eighth inverted pulse signals from said first to eighth inverting means with the first control signal from said controlling means and for respectively outputting first to eighth multiplied signals; first to eighth control-switching means for respectively switching over between the first to eighth multiplied signals from said first to eighth multiplying means and the first to eighth pulse signals from said first to eighth pulse generating means in accordance with the fade-in or fade-out operation of the second control signal and for respectively outputting first to eighth control-switched signals; and first to eighth switching means, respectively responsive to the first to eighth control-switched signals from said first to eighth control-switching means, for selectively outputting an 8-bit restored luminance signal from said video decoding means as the adjusted luminance signal; and means for converting the first video-decoded signal from said video decoding means and the adjusted luminance signal from said screen fade driving means into analog signals and for providing an RGB signal.

18. The apparatus for generating a screen fade effect in a video disc reproducing system as claimed in claim 17, wherein the first, second and third video-decoded signals are respectively a restored chrominance signal, a restored luminance signal and a video information data signal.

19. The apparatus for generating a screen fade effect in a video disc reproducing system as claimed in claim 17, wherein the first and second control signals are respectively a control signal and a switching control signal.

20. The apparatus for generating a screen fade effect in a video disc reproducing system as claimed in claim 17, wherein said first to eighth control-switching means are respectively responsive to first to eighth switching control signals from said controlling means.

21. The apparatus for generating a screen fade effect in a video disc reproducing system as claimed in claim 17, wherein each of said first to eighth multiplying means comprises an AND gate, and each said first to eighth inverting means comprises an inverter.

22. The apparatus for generating a screen fade effect in a video disc reproducing system as claimed in claim 17, wherein the separated vertical synchronizing signal is applied from said vertical synchronizing signal outputting means to a CLK terminal of each of said first to eighth pulse generating means, and the first control signal is applied from said controlling means to a LD terminal of each of said first to eighth pulse generating means.

23. The apparatus for generating a screen fade effect in a video disc reproducing system as claimed in claim 17, wherein the first to eighth pulse signals are respectively outputted from RCO terminals of said first to eighth pulse generating means, and the first to eighth inverted pulse signals are respectively applied to ENP terminals of said first to eighth pulse generating means.

24. The apparatus for generating a screen fade effect in a video disc reproducing system as claimed in claim 17, wherein each of said first to eighth pulse generating means comprises a timer.

25. The apparatus for generating a screen fade effect in a video disc reproducing system as claimed in claim 17, wherein the first to eighth multiplied signals from said first to eighth multiplying means have high-level durations which increase in order by N period of the separated vertical synchronizing signal with reference to the time position of the leading edge of the first control signal from said controlling means.

26. The apparatus for generating a screen fade effect in a video disc reproducing system as claimed in claim 17, wherein said first to eighth control switching means respectively switch over to the output terminals of said first to eighth multiplying means in order to execute a fade-in operation and the restored luminance signal from said video decoding means is provided selectively to said converting means.

27. The apparatus for generating a screen fade effect in a video disc reproducing system as claimed in claim 17, wherein said first to eighth control-switching means respectively switch over to the outputs of said first to eighth pulse generating means in order to execute a fade-out operation and the restored luminance signal from said video decoding means is selectively provided to said converting means.

28. The apparatus for generating a screen fade effect in a video disc reproducing system as claimed in claim 17, wherein said first to eighth switching means respectively switch over to the outputs of said first to eighth pulse generating means in order to execute a fade-out operation and the restored luminance signal from said video decoding means is selectively provided to said converting means.

* * * * *